(12) United States Patent
Wilbs et al.

(10) Patent No.: US 6,575,655 B1
(45) Date of Patent: Jun. 10, 2003

(54) PROFILE SYSTEM

(75) Inventors: Thomas Wilbs, Uhlingen-Birkendorf (DE); Thomas Speicher, Waldshut-Tiengen (DE)

(73) Assignee: alfer Aluminum Gesellschaft mbH, Wutöschingen (DE)

( * ) Notice: Subject to any disclaimer, the term of this patent is extended or adjusted under 35 U.S.C. 154(b) by 135 days.

(21) Appl. No.: 09/696,421

(22) Filed: Oct. 25, 2000

(30) Foreign Application Priority Data

Nov. 11, 1999 (DE) .......................... 199 54 303

(51) Int. Cl.⁷ ............................................ E04G 3/00
(52) U.S. Cl. ................................ 403/109.1; 403/345
(58) Field of Search .................. 403/109.1–109.7, 403/345

(56) References Cited

U.S. PATENT DOCUMENTS

| | | | |
|---|---|---|---|
| 2,035,488 A | | 3/1936 | McArthur, Jr. |
| 3,004,743 A | | 10/1961 | Wenger |
| 5,004,203 A | * | 4/1991 | Fabius ................. 403/109.1 X |
| 5,826,847 A | | 10/1998 | Warner et al. |
| 5,845,664 A | * | 12/1998 | Ryder et al. ......... 403/109.3 X |
| 5,876,011 A | * | 3/1999 | Blasing ............... 403/109.1 X |
| 5,897,268 A | | 4/1999 | Deville |
| 6,045,288 A | * | 4/2000 | Pasternak et al. ........ 403/109.3 |

FOREIGN PATENT DOCUMENTS

| | | |
|---|---|---|
| DE | 366870 | 1/1923 |
| DE | 1627531 | 9/1967 |
| DE | 3148210 | 6/1983 |
| DE | 4419558 | 12/1994 |
| DE | 4022854 | 8/1995 |
| DE | 69502474 | 9/1995 |
| DE | 19511006 | 10/1995 |
| EP | 0314357 | 5/1989 |
| FR | 2410162 | 6/1979 |
| FR | 2668558 | 4/1992 |
| GB | 2101258 | 1/1983 |

OTHER PUBLICATIONS

*Metrisches ISO–Gewinde allgemeiner Anwendung*, Ref. No. DIN 13–1:1999–11.

* cited by examiner

Primary Examiner—Lynne H. Browne
Assistant Examiner—John R. Cottingham
(74) Attorney, Agent, or Firm—Notaro & Michalos P.C.

(57) ABSTRACT

The invention relates to a kit of threaded rods and tubes. The object of the invention is to develop a kit of threaded rods and tubes with which many combination possibilities of threaded rods with tubes and of tubes amongst one another is possible. This object according to the invention is achieved in that in a kit consisting of threaded rods and tubes, to a standardised threaded rod there is allocated a tube whose inner diameter envelops the threaded rod at a distance and whose outer diameter is smaller than the inner diameter of the tube of the next larger threaded rod-tube allocation.

6 Claims, 9 Drawing Sheets

PROFILE SYSTEM

FIELD AND BACKGROUND OF THE INVENTION

The invention relates to a kit of threaded rods and tubes.

Threaded rods and tubes for construction and craftwork are used very much. Furniture, shelf constructions, simple technical structures up to very complicated apparatus are made. Conceivable is also the application in the household, e.g. as curtain rails, hinges or mountings for table tops, etc.

Above all the combination of threaded rods with tubes or of tubes amongst one another creates great difficulties. Often for the required nominal size of a threaded rod there is not available any tube with a sufficiently large inner diameter for enveloping the threaded rod. It is then very difficult when for the threaded rod-tube combination to be matched there is yet to be found an additional tube which at a distance envelops the tube enclosing the threaded rod. With the selection then not only is the inner diameter of the tube surrounding the threaded rod to be considered but additionally one must take into account the correct selection of the outer diameter of this tube. This problem is multiplied with designs in which several tubes are to be inserted into one another in a telescopic manner.

SUMMARY OF THE INVENTION

It is the object of the invention to specify a kit of threaded rods and tubes with which there are possible many combination possibilities of threaded rod with tubes or tubes amongst one another.

According to the invention this object is achieved in that in a kit, consisting of threaded rods and tubes, to a standardised threaded rod there is allocated a tube whose inner diameter envelops the threaded rod at a distance and whose outer diameter is smaller than the inner diameter of the tube of the next larger threaded rod-tube allocation.

By way of the use of this kit there result very many combination possibilities of threaded rods with tubes or of tubes amongst one another. The time-consuming search for matching threaded rods and tubes is done away with. This is particularly advantageous for people with little prior technical knowledge since for the tubes obtainable on the market often not all details with regard to inner diameter and wall thickness are evident. With only one kit one obtains the possibility for example of using tubes as guide rails or hinges. It is particularly advantageous that the tubes may be inserted into one another in a telescopic manner.

A particularly advantageous kit consisting of threaded rods and tubes contains a first group of metric threaded rods according to the Standard DIN 13 T 1 in the grading M8, M12, M16 and M20, wherein to each threaded rod there is allocated a tube which has an outer size which is 3.5 mm larger than the nominal size of the associated threaded rod. The combination amongst other things permits the telescopic insertion into one another of all tubes contained in the kit. A further large advantage of this combination lies in the fact that it is the case exclusively of standardised commercially available threaded rods with usual nominal diameters. By way of this the combination variety is increased further since commercially available nuts and other threaded attachments may be combined with the kit.

A particularly advantageous embodiment form of the invention provides for the tubes belonging to the threaded rods with the grading M8, M12, M16, M20 to have a tube wall thickness of 1.5 mm. The distance between the threaded rod and the inner tube wall of the tube belonging to the threaded rod is then roughly always equal, by which means there is always given the same play of the clearance fit with the use in the combination threaded rod-tube. Also the clearance fit of the threaded rod-tube allocation remains the same.

According to a further embodiment form it is advantageously possible to extend the first group of metric threaded rods with the size M5. The tube allocated to this threaded rod has an outer size of approx. 7.5 mm and the tube wall is formed with a thickness of about 1 mm. By way of this extension it is possible to use the kit for applications in which threads with a relatively small nominal diameter are required. The tube allocated to this threaded rod may be introduced into the next larger tube of this group without any problem.

It is particularly advantageous to extend the first group of threaded rods with threaded rods with the metric nominal sizes M24 and M30. To each of these threaded rods there is allocated a tube which has an outer size about 5.5 mm larger than the nominal size of the associated threaded rod, wherein the tube wall is designed with a wall thickness of about 2.4 mm. By way of this extension it is possible to use the kit for applications in which threads with a relatively large nominal diameter are required. The tubes allocated to these threaded rods may be combined with the tubes of the first group without any problem.

A further particularly advantageous kit consists of threaded rods and tubes which contain a second group of metric threaded rods according to the Standard DIN 13 T1 in the grading M6, M10, M14 and M18, wherein to each threaded rod there is allocated a tube which has an outer size which is about 3.5 mm larger than the nominal size of the associated threaded rod. Also this combination permits amongst other things the telescopic insertion into one another of all tubes contained in the kit. A further great advantage of this combination lies in the fact that with the threaded rods used in this kit it is also the case of standardised commercially available threaded rods with standardised nominal diameters. By way of this the combination variety is increased further since commercially available nuts and other widely used threaded attachments may be combined with the kit.

A particularly advantageous embodiment form of the invention provides for the tubes belonging to the threaded rods with the grading M6, M10, M14, M18 to have a wall thickness of 1.5 mm. The distance between threaded rod and inner tube wall of the tube belonging to a threaded rod is then roughly always equal, by which means there is always given the same play of the clearance fit with the use in the combination threaded rod-tube. Also the clearance fit of the threaded rod-tube allocation remains the same.

According to a further embodiment form of the invention it is possible to to extend the second group of metric threaded rods with threaded rods with the metric nominal diameters M22 and M27, wherein to the threaded rod with the nominal size M22 there is allocated a tube with an outer size of about 26.5 mm and to the threaded rod with the nominal size M27 there is allocated a tube with the outer size of about 32.5 mm. The wall thickness of the tube with the outer size of 26.5 mm is about 1.9 mm and the wall thickness of the tube with the outer size of 32.5 mm measures about 2.4 mm. By way of this extension it is possible to use the kit for applications in which threads with a relatively large nominal diameter are required. The tubes allocated to these threaded rods may be combined with the tubes of the first group without any problem.

A further advantageous embodiment form of the invention envisages that in a kit of threaded rods and tubes, to each threaded rod there is allocated a tube with a square profile which encloses the threaded rod at a distance and whose outer sides are shorter than the inner sides of the square tube profile of the next largest threaded rod-square tube allocation. Tubes with a square cross section may be ideally used as e.g. guide rails, wherein they are infinately extendable in length by the possibility of the telescopic insertion into one another within a kit. Also the combination of threaded rod and tube is conceivable for many applications such as e.g. shelf constructions. Thus all advantages described in the case of circular tubes also apply to tubes with a square profile. There opens up the possibility on account of the similarity of the sizes of circular tube and square tube of then additionally combining these, so that e.g. a round tube with an inner lying threaded rod is insertable into a tube with a square profile.

According to a further embodiment example of the invention the kit consists of a first group of threaded rods which have metric sizes in the grading M8, M12, M16 and M20, wherein to each threaded rod there is allocated a tube with a square profile with which the outer distance of the opposite sides is about 3.5 mm more than the nominal size of the associated threaded rod.

A particularly advantageous embodiment form of the invention provides for the tube wall of the tubes with a square profile belonging to the first group of threaded rods to have a tube wall thickness of about 1.5 mm. The distance between the threaded rod and the middle points of the sides is always equal, by which means there is always given the same play of the clearance fit with the use in the combination threaded rod-tube. Also the clearance fit of the threaded rod-tube allocation remains the same.

According to a further embodiment form of the invention it is possible the extend the first group of threaded rods additionally with a threaded rod with the metric size M5, wherein to the threaded rod there is allocated a tube with a square profile with which the outer distance of the opposite sides is about 7.5 mm and the tube wall is formed with a thickness of about 1 mm.

In order to further increase the combination variety the first group of threaded rods is extended with threaded rods with the nominal size of M24 and M30 to which in each case there is allocated a tube with a square profile, wherein the distance of the outer sides is about 5.5 mm more than the nominal size of the associated threaded rod, and the tube wall is formed with a wall thickness of about 2.4 mm.

According to a further embodiment form of the invention the kit consists of a second group of threaded rods which have metric sizes in the grading M6, M10, M14 and M18, wherein to each threaded rod there is allocated a tube with a square profile and the outer distance of the opposite sides measures about 3.5 mm more than the nominal size of the allocated threaded rod.

A further advantageous embodiment form provides for the tube wall of the tubes with a square profile belonging to the second group of threaded rods to have a tube wall thickness of about 1.5 mm.

According to a further embodiment form the second group of threaded rods is extended with threaded rods with a nominal size of M22 and M27, wherein to the threaded rod with the nominal size M22 there is allocated a tube with a square profile with which the outer distance of the opposite sides is about 26.5 mm, and to the threaded rod with a nominal size M27 there is allocated a tube with a square profile with which the outer distance of the opposite sides measures about 32.5 mm.

According to a particularly advantageous embodiment form the tube with a square profile belonging to the threaded rod with the metric nominal diameter M22 has a tube wall thickness of about 1.9 mm and the tube belonging to the threaded rod with the metric nominal diameter M27 a wall thickness of about 2.4 mm.

A particularly advantageous embodiment form of the invention envisages that to each threaded rod there is allocated a tube with a rectangular profile which encloses the threaded rod at a distance and whose outer sides are shorter that the corresponding inner sides of the rectangular tube of the next largest threaded rod-tube allocation. By way of extending the kit then round tubes may be combined with rectangular and square tubes. Particularly advantageous with the extension is the fact that the square tubes may be ideally guided in the rectangular tubes since the length of the longer profile sides of the rectangular tubes corresponds to a whole number multiple of the outer distance of the opposite longer profile sides.

It is of a particular advantage that the kit consists of a first group of threaded rods which have metric sizes in the grading M8, M12, M16, M20, wherein to each threaded rod there is allocated a tube with a rectangular profile with which the outer distance of the opposite longer profile sides measures about 3.5 mm more than the nominal size of the associated threaded rod, and the length of the longer profile side corresponds at least to a multiple of the outer distance of the longer profile sides. By way of the selection of these threaded rods one obtains a further spectrum of combination possibilities fitting with one another.

According to a further embodiment form the tube wall of the tubes with a rectangular profile belonging to the first group of threaded rods has a tube wall thickness of about 1.5 mm.

According to a further advantageous embodiment form the first group of threaded rods is extended additionally with a threaded rod with the metric size M5, wherein to the threaded rod there is allocated a tube with a rectangular profile with which the outer distance of the opposite longer profile sides is about 7.5 mm and the length of the longer profile side corresponds at least to a multiple of the outer distance of the longer profile sides and the tube wall is formed with a thickness of about 1 mm.

It is particularly advantageous that the first group of threaded rods is extended with threaded rods with a nominal size of M24 and M30, to which in each case there is allocated a tube with a rectangular profile, wherein the outer distance of the opposite longer profile sides measures about 5.5 mm more than the nominal size of the associated threaded rod, and the length of the longer profile side corresponds at least to a multiple of the outer distance of the longer profile sides, wherein the tube wall is formed with a wall thickness of about 2.4 mm.

It is particularly advantageous that the kit consists of a second group of threaded rods which comprise metric sizes in the grading M6, M10, M14 and M18, wherein the outer distance of the opposite longer profile sides measures about 3.5 mm more than the nominal size of the associated threaded rod, and that the length of the longer profile side corresponds at least to a multiple of the outer distance of the longer profile sides.

According to a farther embodiment form the tube wall of the tubes with a rectangular profile belonging to the second group of threaded rods has a tube wall thickness of about 1.5 mm.

The combination variety is further increased when the second group of threaded rods is extended with threaded rods with a nominal size of M22 and M27, wherein to the threaded rod with the nominal size M22 there is allocated a tube with a rectangular profile with which the outer distance of the opposite longer profile sides is about 26.5 mm, and to the threaded rod with the nominal size M27 there is allocated a tube with a rectangular profile with which the outer distance of the opposite lying longer profile sides measures about 32.5 mm and the length of the longer profile side corresponds at least to a multiple of the outer distance of the longer profile sides.

According to a.particularly advantageous embodiment form the tube with a rectangular profile belonging to the threaded rod with the metric nominal diameter M22 has a wall thickness of about 1.9 mm and the tube with a rectangular profile belonging to the threaded rod with the metric nominal diameter M27 a tube wall thickness of about 2.4 mm.

A particularly advantageous kit envisages that to threaded rod there is allocated a U-profile which encloses the threaded rod on three sides at a distance and whose outer sides are shorter than the corresponding inner side of the U-profile of the next larger threaded rod-U-profile allocation. By way of extending the kit then round tubes may be combined with rectangular tubes, square tubes and U-profiles. Particularly advantageous with the extension by way of the described U-profiles is that the square tubes may be ideally guided in the U-profiles since the length of the longer profile sides of the U-profile corresponds at least to a whole-numbered multiple of the length of the shorter sides and thus at least to a whole-numbered multiple of the length of the associated square tube. There also exists the possibility of combining rectangular tubes with U-profiles since the longer profile side of the U-profile in its dimensions behaves just as the longer profile sides of the associated tube with a rectangular profile.

It is of a particular advantage that the kit consists of a first group of threaded rods which have metric sizes in the grading M8, M12, M16 and M20, wherein to each threaded rod there is allocated a U-profile with which the shortest profile sides measure about 3.5 mm more than the nominal size of the associated threaded rod, and the length of the longer profile side corresponds at least to a multiple of the length of the shorter profile sides. By way of the selection of these threaded rods one obtains a further spectrum of combination possibilities which fit with one another.

According to one embodiment form the wall of the U-profile belonging to the first group of threaded rods has a thickness of about 1.5 mm.

According to a further embodiment form the first group of threaded rods is additionally extended with a threaded rod with the metric size M5, wherein to the threaded rod there is allocated a U-profile with which the length of the shorter profile sides is about 7.5 mm and with which the length of the longer profile side is at least a multiple of the length of the shorter profile sides, and the wall is formed with a thickness of about 1 mm.

In order to increase the combination variety the first group of threaded rods is extended with threaded rods with a nominal size of M24 and M30 to which in each case there is allocated a U-profile, wherein the shorter profile sides measure about 5.5 mm more than the nominal size of the associated threaded rod and with which the length of the longer profile side corresponds at least to a multiple of the length of the shorter profile sides, wherein the wall is formed with a thickness of about 2.4 mm.

It is of a particular advantage that the kit consists of a second group of threaded rods which have metric sizes in the grading M6, M10, M 14 and M 18, wherein to each threaded rod there is allocated a tube with a U-profile with which the shorter sides measure about 3.5 mm more than the nominal size of the associated threaded rod, and the length of the longer profile side corresponds at least to a multiple of the length of the shorter profile sides.

According to a further advantageous embodiment form the wall of the U-profiles belonging to the second group of threaded rods has a thickness of about 1.5 mm.

The combination variety is increased in that the second group of threaded rods is extended with threaded rods with a nominal size of M22 and M27, wherein to the threaded rod with the nominal size M22 there is allocated a U-profile with which the length of the shorter profile sides is about 26.5 nun, and to the threaded rod with the nominal size M27 there is allocated a U-profile with which the length of the shorter sides measures about 32.5 mm, and the length of the longer profile side corresponds to at least a multiple of the length of the shorter profile sides.

It is of a particular advantage that the U-profile belonging to the threaded rod with the metric diameter M22 has a wall thickness of about 1.9 mm and that the U-profile belonging to the threaded rod with the metric nominal diameter M27 has a wall thickness of about 2.4 mm.

According to a further embodiment form of the invention the kit comprises tubes with integrally formed webs, wherein the web is arranged in particular tangentially. This construction manner is ideally suitable for the design of door hinges. It is conceivable to provide the webs with holes for screws so that in a simple manner plates, doors or likewise may be attached on the web.

If the plate is to be fastened to the joint centrally then a further embodiment form of the inventions lends itself with which the kit comprises tubes with integrally formed webs, wherein the web stands orthogonally on the radius.

According to a further embodiment form the kit comprises U-profiles and/or tubes with a square or rectangular profile with integrally formed webs. By way the webs there results new fastening possibilities and rest surfaces. The functionality of the kit is increased.

In order to increase the sliding effect between the rod with the integrally formed web and the threaded rod it is envisaged that between the threaded rod and the tube with the integrally formed web there is insertable a reduction tube. This has a particularly advantageous effect when the reduction tube is formed of e.g. plastic. The sliding effect is increased considerably by way of this.

According to an advantageous embodiment form of the invention all tubes and U-profiles of the kit in two groups of tubes are designed able to be put together into one another in a telescopic manner. By way of this the lengthening of the tubes is simplified and there results new design possibilities.

Furthermore the invention contains a method for the kink-free bending of tubes. Tubes may not be bent in a kink-free manner without special bending devices. The tube allocated to a certain threaded rod is pushed over the threaded rod. Then the tube is co-bent in a kink-free manner by bending the threaded rod.

The invention is described in more detail by way of the drawings which shown embodiment examples of the invention. There are shown:

DESCRIPTION OF THE PREFERRED EMBODIMENTS

Figure 1:
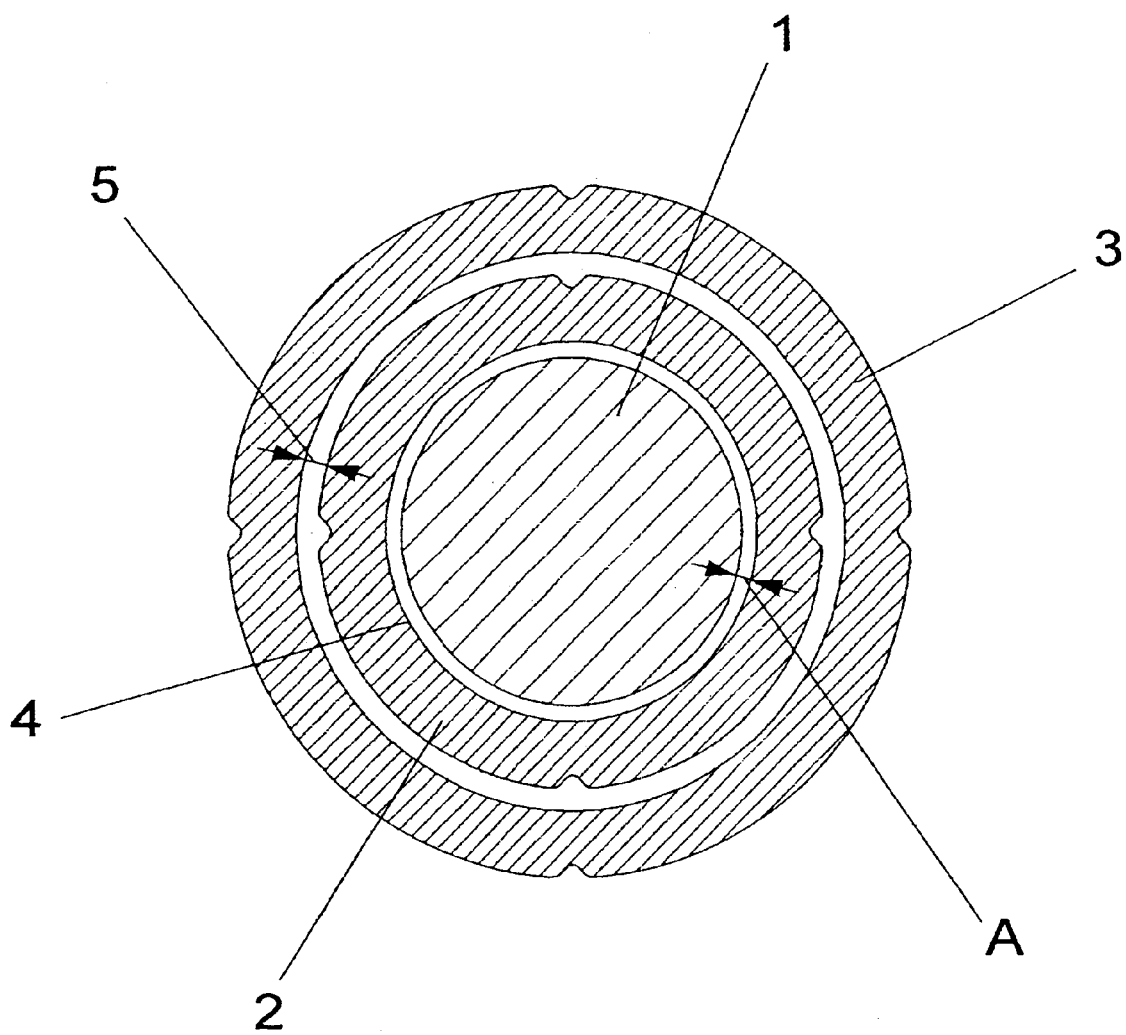
FIG. 1: a section through a threaded rod-tube allocation as a consituent part of the kit according to the invention, which in turn is enveloped by a tube.

FIG. 1 shows a threaded rod 1 with a metric nominal size to which there is allocated a tube 2 whose inner diameter envelops the threaded rod at a distance A and whose outer diameter is smaller than the inner diameter of the tube 3 of the next larger threaded rod-tube allocation. The distance A between the threaded rod 1 and the inner wall 4 of the tube 2 with both groups of threaded rods with a centric arrangement from M5 to M20 is about 0.25 mm, from M20 to about 0.35 mm. The tube wall thickness of the tube for the threaded rod M5 is about 1 mm, the tube wall thickness of the tubes for the threaded rods M6 to M20 is about 1.5 mm, the tube wall thickness of the tubes for the threaded rod M22 about 1.9 mm and the tube wall thickness of the tubes for the threaded rods M24 to M30 is about 2.4 mm. With a centric arrangement the play 5 at both sides between the tubes 2 and 3 is with the tubes for threaded rods up to M20 about 0.5 mm, from M22 about 0.6 mm. Rods M5 have a nominal diameter of 5 mm, M20 have nominal diameter of 20 mm and so on.

Figure 2:
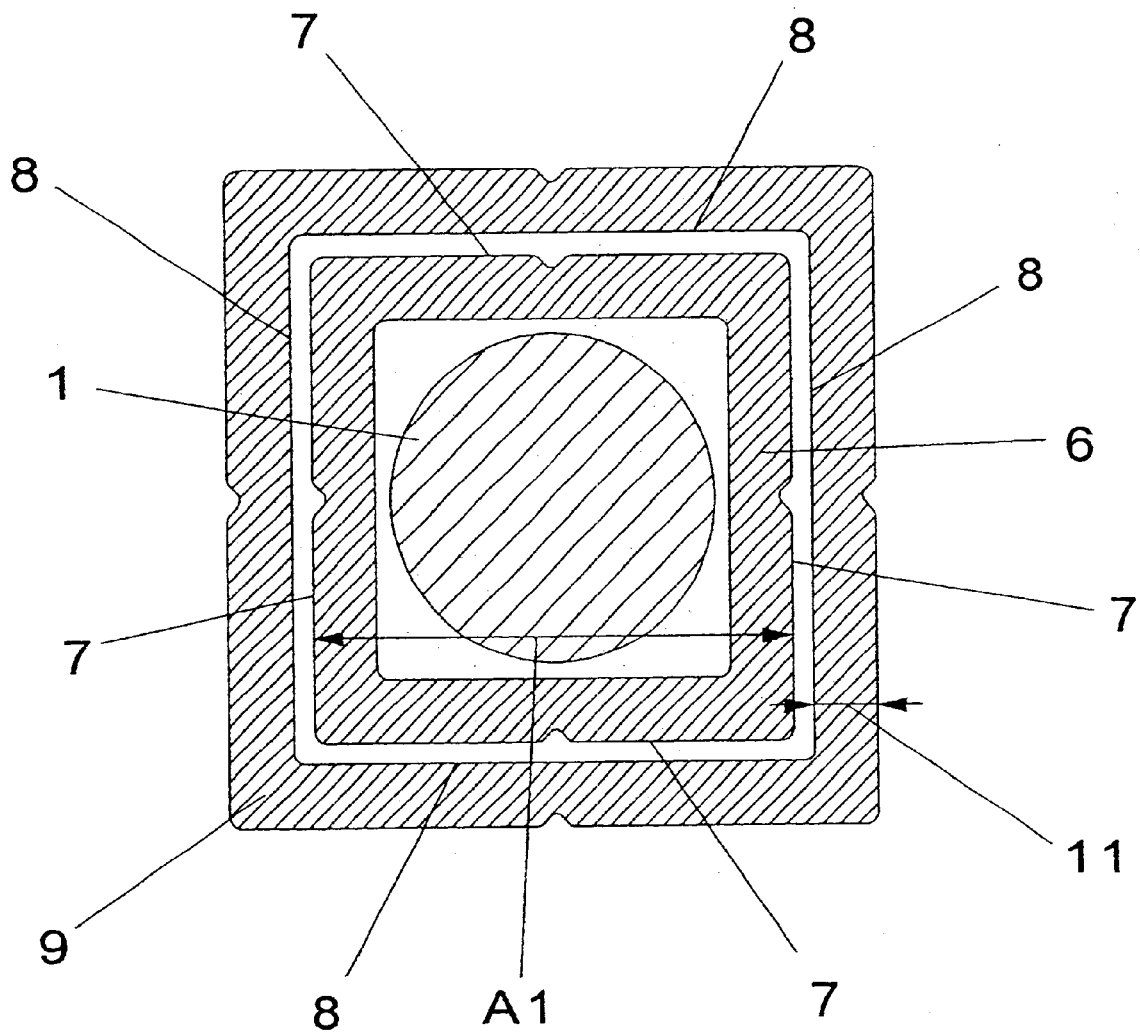
FIG. 2: a section through a threaded rod-tube allocation with a square profile as a consituent part of the kit according to the invention, which in turn is enveloped by a tube with a square profile.

In FIG. 2 there is shown a threaded rod 1 to which there is allocated a tube with a square profile 6 which envelops the threaded rod 1 at a distance. The outer sides 7 of the tube with a square profile 6 are shorter than the inner sides 8 of the next larger square tube 9. The distance A1 of two opposite sides and the wall thickness 11 behave as with the outer diameter and as with the tube wall thickness respectively of the corresponding round tubes. To a threaded rod with a metric nominal size of M10 there is allocated a round tube with an outer diameter of about 13.5 mm. The opposite sides of the corresponding tube with a square profile thus have a distance A1 of about 13.5 mm.

Figure 3:
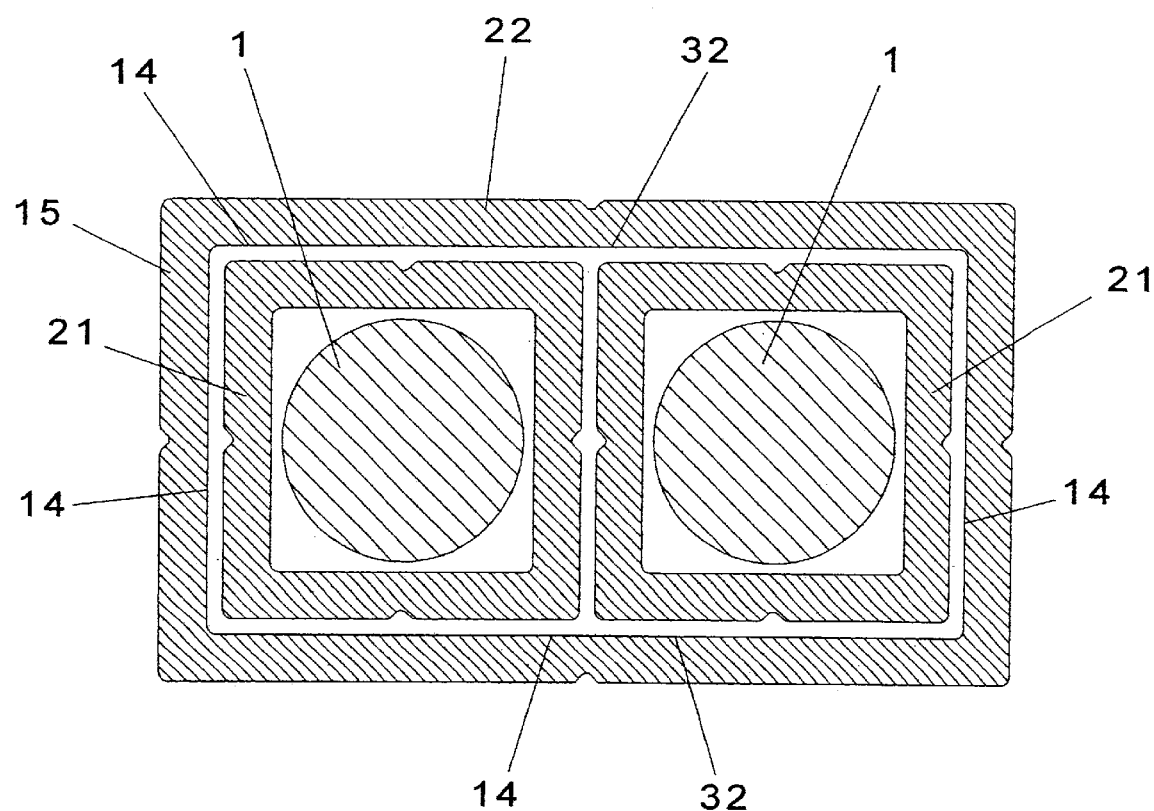
FIG. 3: a section through two threaded rod-tube allocations with a square profile as a consituent part of the kit, which in turn is enveloped by a tube with a rectangular profile.

In FIG. 3 there are shown two threaded rods which have metric sizes and to which in each case there is allocated a tube with a square profile 21 which envelops the threaded rods at a distance. This arrangement is enveloped by a rod 22 with a rectangular cross section, wherein the length of the longer, inner profile sides 32 of the inner surfaces 14 corresponds at least to a whole-numbered multiple of the corresponding tubes 21 with a square profile. To a threaded rod with a nominal size of M10 there is allocated a tube with a quadratic profile. The length of the outer profile side 15 of the tube as described above is about 13.5 mm. The length of the longer, inner profile sides 32 is thus about 13.5 mm, 27 mm, 40.5 mm etc.

Figure 4:
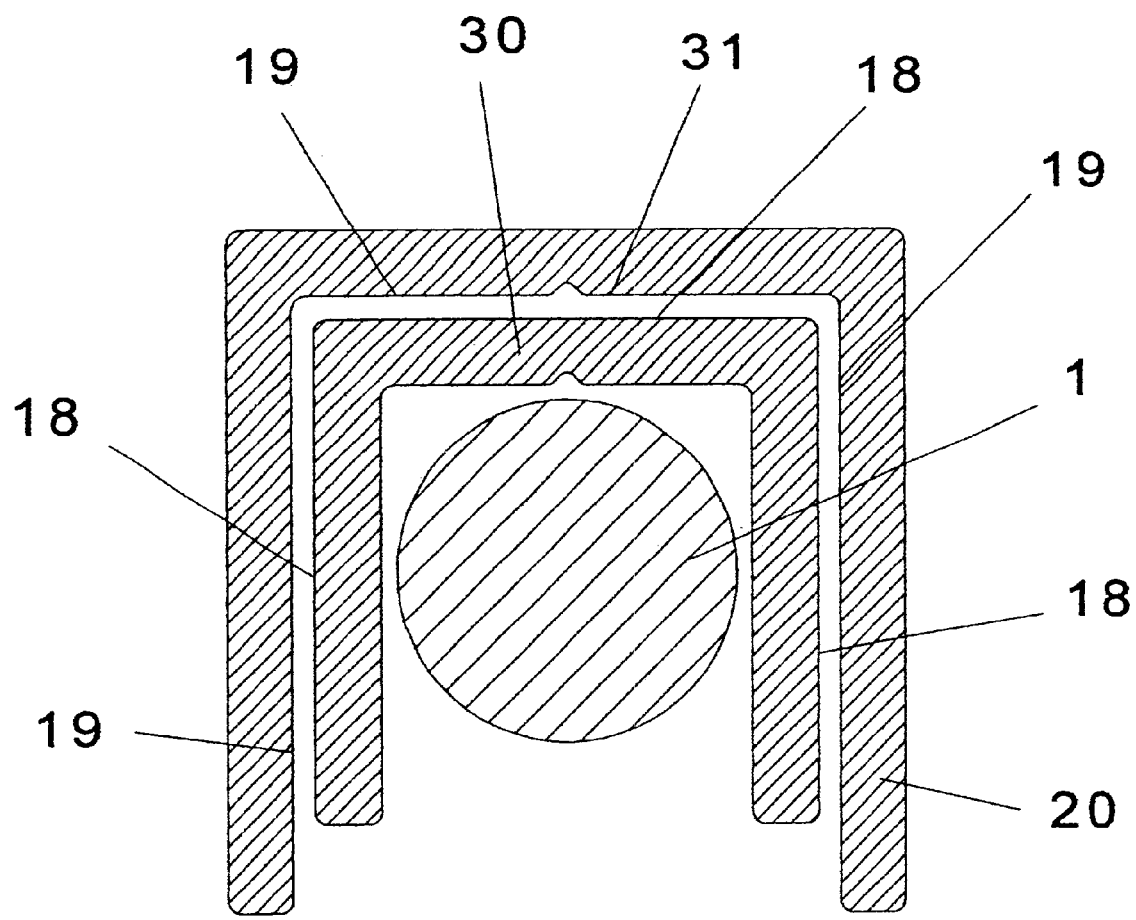
FIG. 4: a section through a threaded rod-tube allocation with a U-profile as a constituent part of the kit according to the invention, which in turn is enveloped by a tube with a U-profile.

In FIG. 4 there is shown a threaded rod 1 to which there is allocated a U-profile 30 which envelops the threaded rod on three sides at a distance, and whose outer sides 18 are shorter than the corresponding inner sides 19 of the next larger U-profile 20. Furthermore the length of the longer, inner base side 31 corresponds at least to a whole-numbered multiple of the corresponding tubes with a square profile. The length of the outer profile side of the tube is as described above about 13.5 mm. The length of the longer, inner base side 31 is thus about 13.5 mm, 27 mm, 40.5 mm etc.

Figure 5:
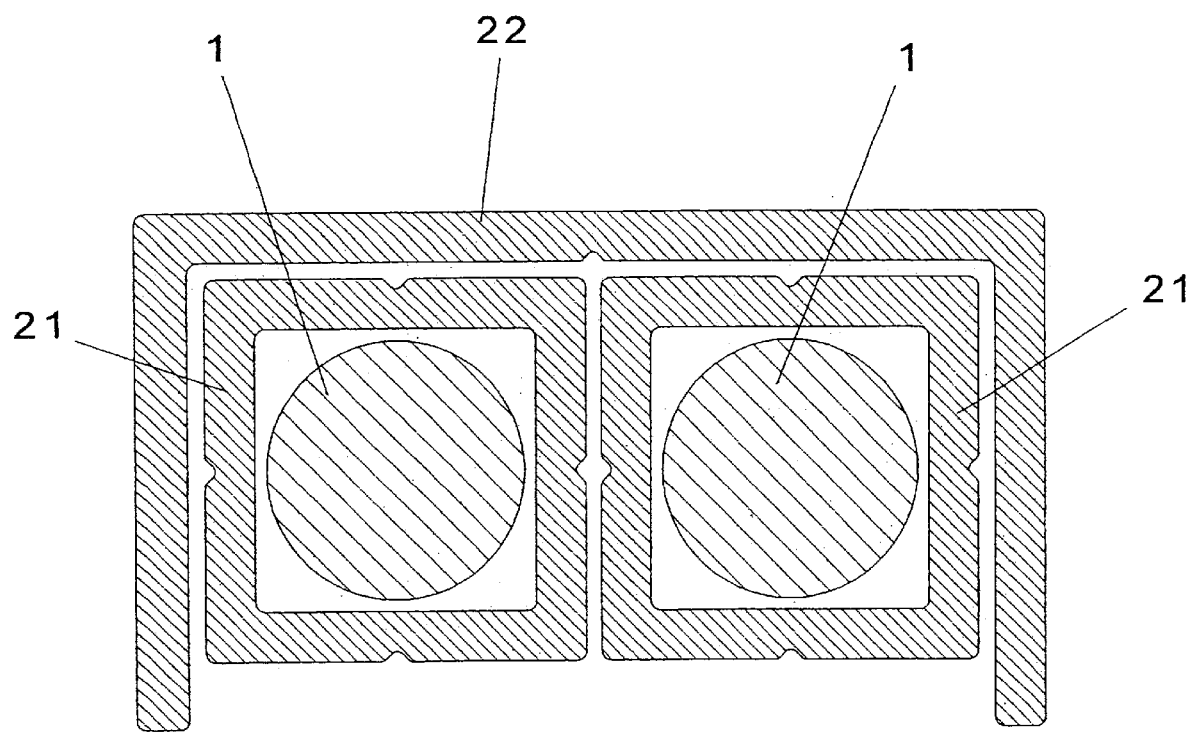
FIG. 5: a section through two threaded rod-tube allocations with a square profile as a consituent part of the kit, which in turn is enveloped by a tube with a U-profile, FIG. 6 a section of two tubes with integrally formed webs, FIG. 7 a U-profile with integrally formed webs, FIG. 8 a reduction tube inserted between a tube with an integrally formed web and a threaded rod and FIG. 9 a combination of a kink-free bent tube with an inner-lying threaded rod.

FIG. 5 shows two threaded rods 1 to which in each case there is allocated a tube with a square cross section which encloses the respective threaded rod at a distance. Around the two tubes with a square profile in turn there is arranged a U-profile 22. The length of the inner, longer side of the U-profile corresponds roughly to double the length of an associated rod with a square profile 21.

Figure 6:
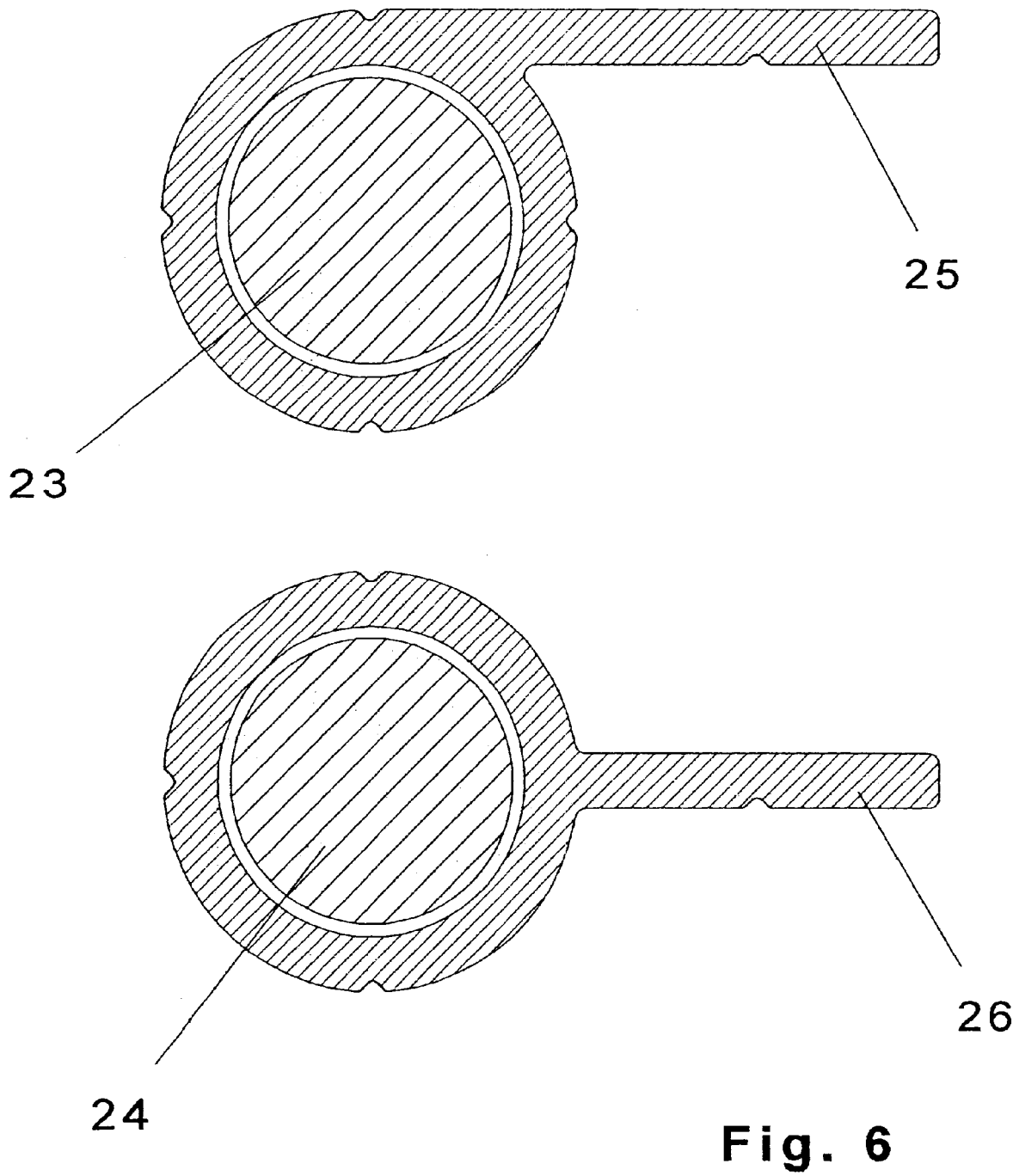

FIG. 6 shows two threaded rods 23 and 24. To each of these threaded rods 23 and 24 there is allocated a tube with a integrally formed web which envelops the threaded rods 23 and 24 at a distance. With the tube allocated to the threaded rod 23 the web 25 is arranged tangentially. With the tube allocated to the threaded rod 24 the web 26 stands orthogonally on the radius of the tube.

Figure 7:
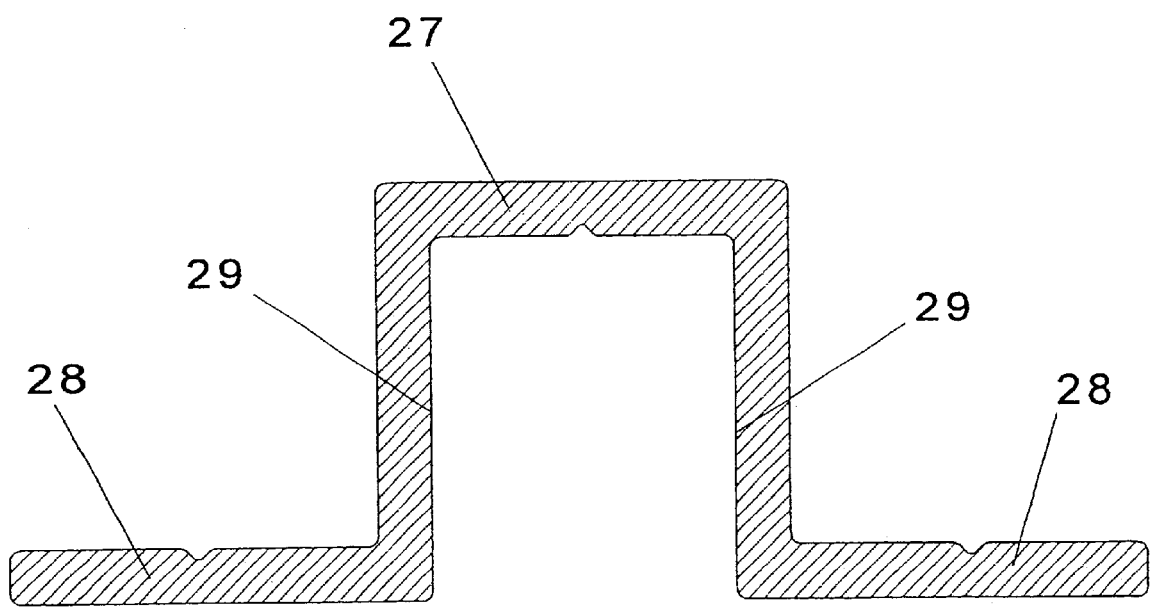

FIG. 7 shows a further embodiment form of the tubes contained in the kit. Here there is shown a U-profile with integrally formed webs 28. In this embodiment example of the webs lie at a right angle to the ends of the shorter profile sides 29 and have a top 27.

Figure 8:
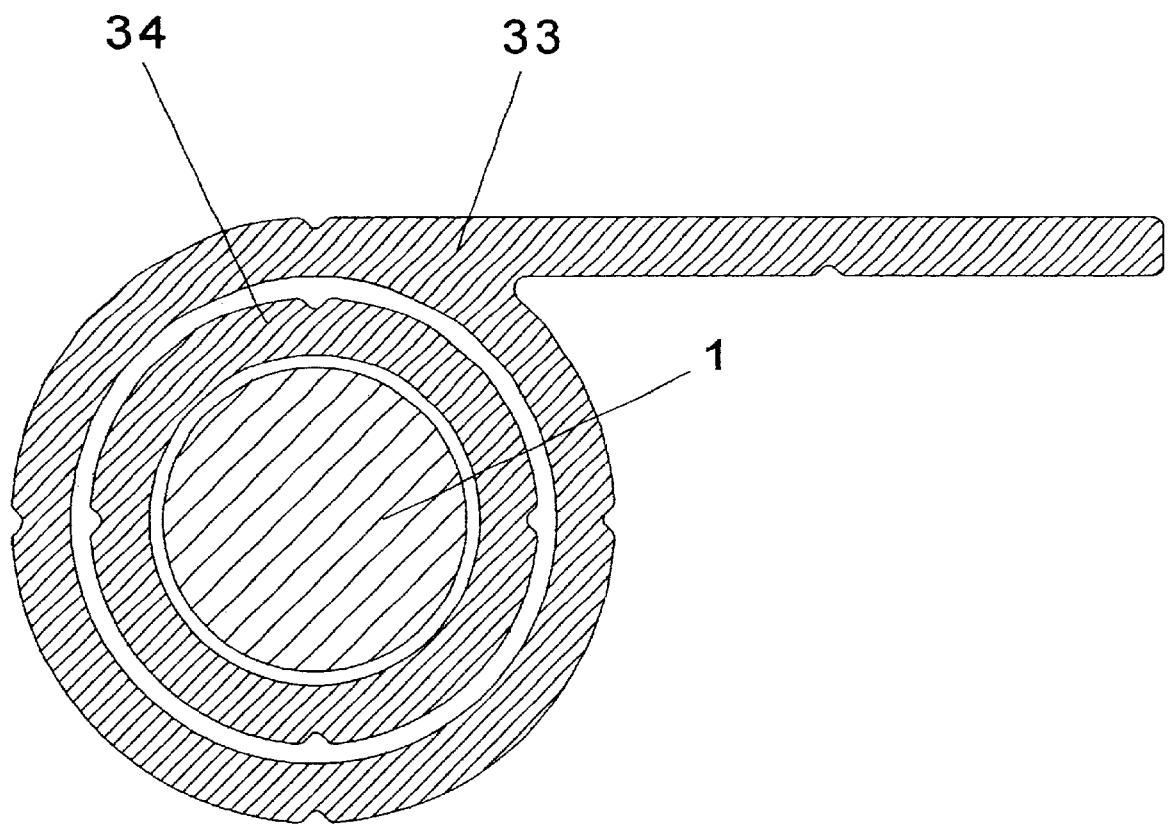

FIG. 8 shows a reduction tube 34 which for increasing the sliding effect is inserted between the threaded rod 1 and the tube with the integrally formed web 33.

Figure 9:
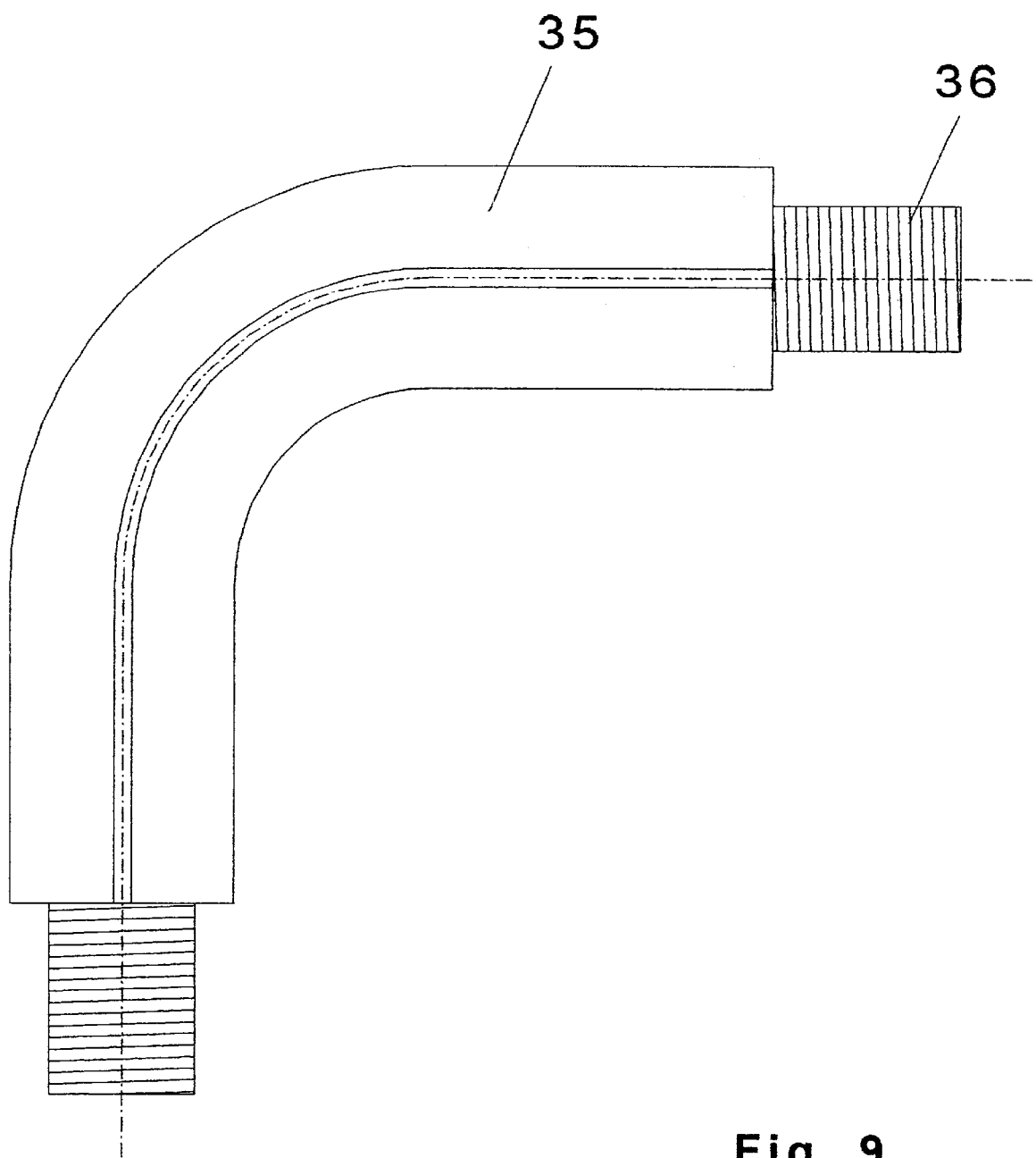

FIG. 9 shows a tube 35 which is pushed over a threaded rod 26 and is bent with it.

What is claimed is:

1. A kit comprising:

a group of threaded rods which have metric dimension M8, M12, M16 and M20 respectively;

a first tube allotted to each of said threaded rods, each first tube enveloping its respective threaded rod at a selected distance and having an outer size which is about 3.5 mm larger than a nominal diameter of its respective threaded rod; and a second tube enveloping each first tube;

all thicknesses of each of the tubes being about 1.5 mm.

2. A kit according to claim 1 wherein the group of threaded rods includes an additional threaded rod of metric dimension M5 and an additional tube enveloping said additional rod which has an outer size of about 7.5 mm and a wall thickness of about 1 mm.

3. A kit according to claim 1 wherein the group of threaded rods includes two further additional threaded rods respectively having metric dimensions M24 and M30, a further additional tube for each further additional threaded rod, each further additional tube having an outer size which about 5.5 mm larger than a nominal diameter of its associated further additional threaded rod, the further additional tubes having wall thicknesses of about 2.4 mm.

4. A kit comprising:
- a group of threaded rods which have metric dimension M6, M10, M14 and M18 respectively;
- a first tube allotted to each of said threaded rods, each first tube enveloping its respective threaded rod at a selected distance and having an outer size which is about 3.5 mm larger than a nominal diameter of its respective threaded rod; and
- a second tube enveloping each first tube;
- all thicknesses of each of the tubes being about 1.5 mm.

5. A kit according to claim 4 wherein the group of threaded rods includes two additional threaded rods having metric dimensions M22 and M27, an additional tube with outer size of about 26.5 mm enveloping the additional threaded rod of M22 and an additional tube of outer size 32.5 mm enveloping the additional threaded rod of M27.

6. A kit according to claim 5 wherein the additional tube with outer size of about 26.5 mm has a wall thickness of about 1.9 mm and the tube of outer size of about 32.5 mm has a wall thickness of about 2.4 mm.

* * * * *